W. F. WALLING.
MEANS FOR PRODUCING IMITATIVE TILE FLOORING AND THE LIKE.
APPLICATION FILED JULY 22, 1919.

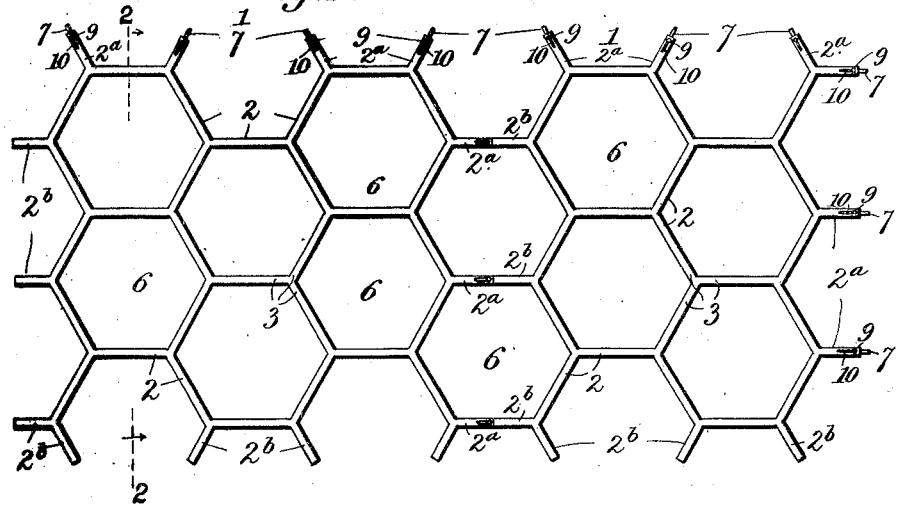
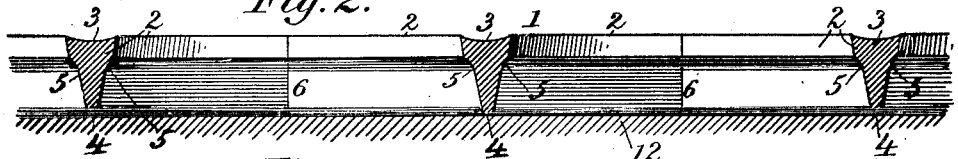
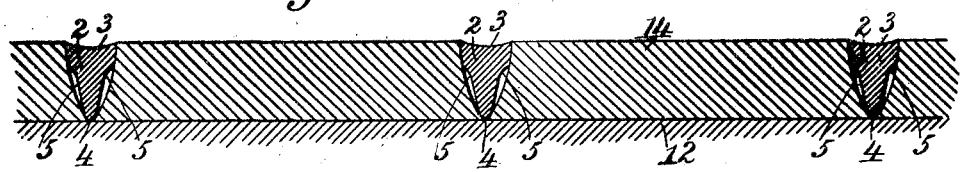
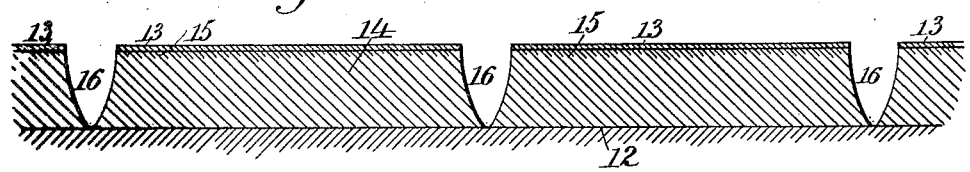
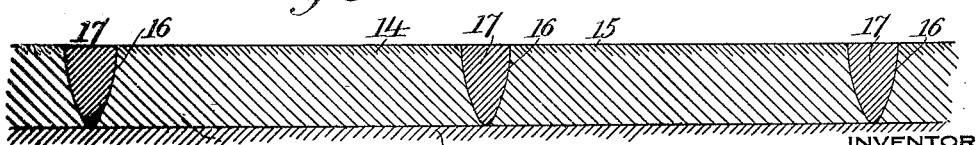

1,341,528.

Patented May 25, 1920.
2 SHEETS—SHEET 2.

WITNESSES
Chas. H. Durand
F. F. Chapman

William F. Walling
INVENTOR

BY
E. G. Siggers
ATTORNEY

UNITED STATES PATENT OFFICE.

WILLIAM FRED WALLING, OF LOS ANGELES, CALIFORNIA.

MEANS FOR PRODUCING IMITATIVE-TILE FLOORING AND THE LIKE.

1,341,528.    Specification of Letters Patent.    Patented May 25, 1920.

Original application filed May 31, 1917, Serial No. 171,947. Patent No. 1,311,362, dated July 29, 1919. Divided and this application filed July 22, 1919. Serial No. 312,557.

*To all whom it may concern:*

Be it known that I, WILLIAM F. WALLING, a citizen of the United States, residing at Los Angeles, in the county of Los Angeles and State of California, have invented a new and useful Means for Producing Imitative-Tile Flooring and the like, of which the following is a specification.

This invention has reference to means for producing imitative tile flooring, walls, or other covers, and this application is a division of my application Number 171,947, filed May 31, 1917, for the method of producing imitative tile flooring, etc. The object of the invention is to provide a tile covering for a floor or wall, which instead of being made of individual tiles, is of monolithic character and so closely simulates the covering composed of individual tiles as to defy detection from casual observation.

The invention comprises means for the production directly upon a suitable concrete sub-base of a coating capable of being applied and troweled off, which coating may be produced in cement or other plastic material with or without coloring matter incorporated therein, and with grooves in the surfacing simulating tile outlines and filled with strongly adherent cement or other plastic material outlining tile forms either conventional or fanciful.

For the sake of simplicity of description it will be considered that the matter used is cement, and that the tile forms are hexagonal, although, of course, it is to be understood that the invention is not thereby limited to any particular material or any particular form.

As large an area as can be conveniently worked at one time is laid, it being also for convenience of description considered that a tile flooring is to be produced, although the invention is applicable to roadways or walks, or walls.

When the sub-base first produced, and which may be formed of concrete in the usual manner, has sufficiently hardened, a web of tile forms is laid upon the sub-base, such tile forms being made up of as many separate units as may be convenient, with the units secured together to cover as large a surface as can be properly worked at one time. Before laying, such web units or molds are oiled to prevent cement from adhering thereto. Moreover, the web units or forms may be of peculiar construction, as will hereinafter appear. Then a surfacing of cement of suitable quality is applied and troweled off to provide the final finish. After a time the surfacing hardens sufficiently to hold its shape, and then the tile forms and molds, which are made of metal, are removed, this being facilitated by the oil coating, and the surfacing is left with a web of grooves corresponding to the tile forms or molds.

By having the troweled surface coated with shellac or paraffin, but preferably paraffin in solution in a substance such as gasolene or benzene, there is provided a protecting coating so that after the surfacing is sufficiently hardened, a grouting of cement may be applied to the grooves to fill them to the surface, and this grouting being smoothed off and the outer coating of shellac or paraffin removed by a suitable solvent, the surface is left in imitation of a tile surface and, so far as ordinary observation goes, a genuine tile surface. Because of the manner of forming the surface no smoothing down with a rubbing stone is necessary.

Almost any effect producible with tiles may be obtained with the invention, with the advantage that there is provided a flooring or other covering of practically monolithic quality which may be produced upon a large scale and at a far less cost than genuine tiling. Another advantage possessed by the invention is that loosening such as occurs with individually laid tiles does not occur.

The invention will be best understood from a consideration of the following detailed description, taken in connection with the accompanying drawings forming part of this specification, with the further understanding that while the drawings show a practical form of the invention, the latter is not confined to any strict conformity with the showing of the drawings, but may be changed and modified so long as such changes and modifications come within the scope of the appended claims.

In the drawings:—

Figure 1 is a plan view of a small portion of a web for forming or molding the tile surfacing and disclosing the mode of covering a large surface with relatively small web units.

Fig. 2 is a section on the line 2—2 of Fig. 1, but drawn on a much larger scale.

Fig. 3 is a section similar to Fig. 2 but showing the appearance when the tile molds have been filled.

Fig. 4 is a section similar to Fig. 3, but with a protecting coating of paraffin or the like applied and the mold web removed.

Fig. 5 is a section similar to those of the other figures, but showing the grooves left by the removal of the tile forming web filled in with grouting.

Figure 6:
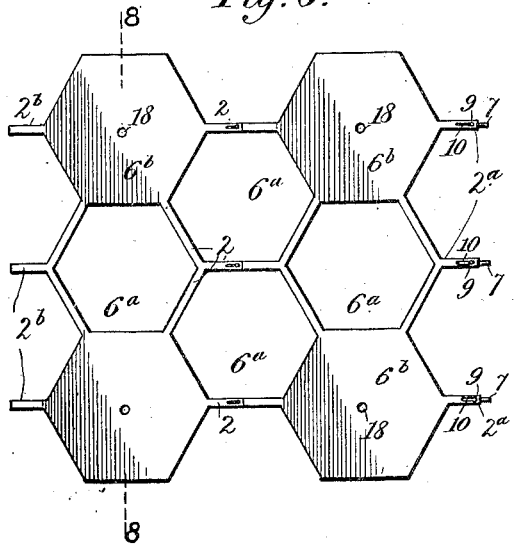
Figs. 6 and 7 are matching tile mold sections for the production of fancy effects.

Referring to the drawings there is shown a web unit 1 made up of connected bars 2 of approximately triangular cross-section, but these bars, although they may be of somewhat elongated wedge shape in cross-section, are preferably shaped as indicated in Figs. 2 and 3 and others of the figures. The bars 2 may be of greater height than width, or otherwise proportioned, and taper from a top surface 3 toward a bottom edge 4, although such edge, instead of being sharpened, may be rounded, as indicated in Figs. 2 and 3 and others of the figures. The top edge 3 is concaved for a purpose which will hereinafter appear, and a portion of the side walls of each bar is concaved, as indicated at 5, the concavity extending from a point somewhat below the top surface of the bar to a point near the lower edge 4, such concavities or channels being for a purpose which will presently appear.

Figures 10, 11, 12:
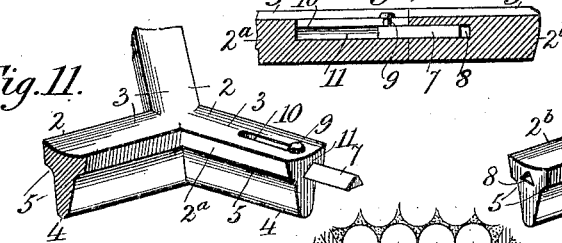
Fig. 10 is a section through the adjacent ends of two connected mold webs.
Figs. 11 and 12 are perspective views of small fragments of mold webs illustrating the manner of connecting web units together.

The bars 2 are arranged in the particular showing of the drawings to provide a series of hexagonal tile molds 6, each series including such a number of molds 6 as may be provided without rendering the mold unit made up of such number of molds inconvenient to handle. Each mold unit has certain marginal bars 2ª provided with pins 7 best shown in Figs. 10 and 11, and other marginal bars 2ᵇ formed with sockets 8, best shown in Figs. 10 and 12, shaped to receive the pins 7. In the particular showing of the drawings the pins 7 are indicated as of triangular cross-section, and the sockets 8 are similarly shaped. The pins 7 are capable of sliding longitudinally in the respective extensions 2ª, and each pin is controlled by a knob 9 movable in a slot 10 extending lengthwise of the bar 2ª, and the latter has a channel 11 into which the slot 10 opens, and of a size and shape to accommodate a respective pin 7. By such means as many tile mold web units as may be conveniently managed may be laid upon a foundation, indicated at 12 in Figs. 2 to 5, with the various units connected together against accidental displacement.

The foundation 12 may be made of concrete or other suitable material, of which concrete may be taken as an example for convenience of description, and the bars 2 of the tile mold webs are then of a height, considering their installed position as substantially level, representing the thickness of the floor surfacing to be laid. Before the tile mold webs, which are made of a suitable metal, are placed in position on the foundation or sub-base 12, they are oiled, so that the material constituting the surfacing of the floor will not adhere to them.

Now, a relatively soft plastic material, such as wet cement, is filled into the mold spaces 6 and the filling is trowled off, even with the then exposed surfaces of the webs.

The concavities or channels 6 pocket some air which during the troweling cannot escape, wherefore the filling in each mold, which filling ultimately represents a tile, does not firmly contact with the upright walls of the mold, and hence here is a greatly lessened resistance to the ultimate removal of the mold from the set tile surfacing. These air pockets also assist during the troweling in permitting an accurate smoothing of the exposed surface of the filling and the edges of the filling adjacent to the surfaces 3 are made sharp and clear by the shearing action of the trowel in passing from the filling surface to the hollow or concave faces of the bars 2. The sharply distinct edges of the grooves, which are formed by the metal webs, and which remain after the webs are removed from the surface, obviate the necessity of grinding of the surface as a final finish.

After the surfacing has hardened sufficiently to hold its shape without liability of damage, a coating of alcohol shellac or of paraffin dissolved in some volatile solvent, such as gasolene or benzene, is applied to the exposed surface, and if applied in a warm state will sink into the exposed surface for a distance. Such coating is indicated in Fig. 4 at 13, but it is to be understood that the proportionate thickness of the coating may be considered as more or less exaggerated, since the coating is for protective purposes, as will hereinafter appear, and that part which does not sink into the surfacing material indicated at 14 may be washed off with such material as the solvent employed in connection with the paraffin or shellac. The sunken-in portion of the coating 13 is indicated at 15. When the web mold is removed from the surfacing 14, such surfacing is covered with a corresponding web of grooves 16 in conformity with the shape of the mold employed, but these grooves are sharp and well defined, thereby differentiating from grooves formed by impressing molds into a soft surfacing.

When the surfacing has sufficiently hardened the grooves are filled with grouting 17 indicated in Fig. 5, which may be troweled even with the surface of the filling 14, which latter composes the tiles. The filling 17 is usually of an appearance contrasting with the appearance of the tiles, it being customary when the tiles are white or of a light color to use a black filling for the grooves, thereby strongly outlining the tiles. Where the tiles are of some color, then the groove filling 17 may be either black or white or some contrasting color.

When the soft surface coating 14 is poured into the molds 6 the setting concrete, in the case of a concrete or cement base 12, being in a semi-setting condition, almost instantly absorbs moisture from the bottom of the surface coating, leaving the top surface soft. The bottom adheres to the concrete sub-base by suction, and is seldom moved from where it first falls, but forms a strongly adherent and substantially homogeneous mass with the sub-base. When troweling begins, the surface of the tile mass 14 is forced out to meet the walls or sides of the mold, the result being that the top, which is the softest, is spread out and reaches the top and widest part of the walls of the mold first, thus pocketing air in the air chambers formed by the channels 5, so that the air therein below the surface of the filling 14 has no chance to escape. The harder the troweling, the less chance for the escape of air in the air chambers formed by the channels 5, thus permitting prolonged troweling without causing the cement or other plastic to adhere to the side walls of the bars 2. For this reason the frames or molds may be left in the setting mass until the last troweling or finish has been applied, and then they can be removed without disturbing or injuring the edges of the grooves thereby produced, since these edges will have become by such time hard enough to be practically beyond harm.

Surfaces of very considerable extent may be finished at one time, but if it should be too extensive it may be done in relatively large sections.

The purpose of the coating 13 is to protect the surface of the formed tiles, while the grouting 17 is being placed in the grooves 16, thus avoiding staining and the necessity of subsequent grinding, since it is customary to have the grouting of contrasting appearance to that of the tile filling 14.

The coating 13 may be applied with a brush or a rag, but experience has shown that a rag is perhaps the best means for the purpose, as by its use the paraffin can be kept out of the grooves more effectively than if a brush be used, and the walls and edges of the grooves are thereby left in a condition that the grout adheres firmly to them without liability of the grout staining the surface of the tile forms.

In the case of shellac the coating 13 may be removed with alcohol after the surface has set. However, a paraffin coating is preferred as it leaves a fine finish, is cheaper than shellac, is excellent for waterproofing, and when applied hot acts as a color preservative of the plastic.

In the foregoing there has been described means for producing a substantially monolithic tile surface of monochrome appearance with the tiles outlined by some contrasting material. If uncolored cement be used for the tiles and black be used for the filling, and the cement employed be of a fine quality, such as Keene's cement, the effect is that of tiles with a matte surface of white with black outlines, if black be the chosen ingredient of the grout filling.

It is often desirable to produce tile effects in various colors. One means for the purpose is shown in Figs. 6 to 9, in which, in Figs. 6 and 8, there is shown a unit made up of tile molds 6$^a$ grouped in a chosen design and having solid portions 6$^b$, so that, with the upper surfaces of the solid portions 6$^b$ flush with the top edges of the molds 6$^a$, and the parts otherwise being similar to the arrangement of Fig. 1 and other figures of the drawing, there can be produced upon the sub-base 12 groups of tiles in white or some chosen color, and after the tiles have sufficiently hardened the form or forms, indicated in Fig. 6, are removed, air holes 18 in the solid portions 6$^b$ and in certain of the bars 2 facilitating the removal of the form without resistance from suction.

Figure 7:
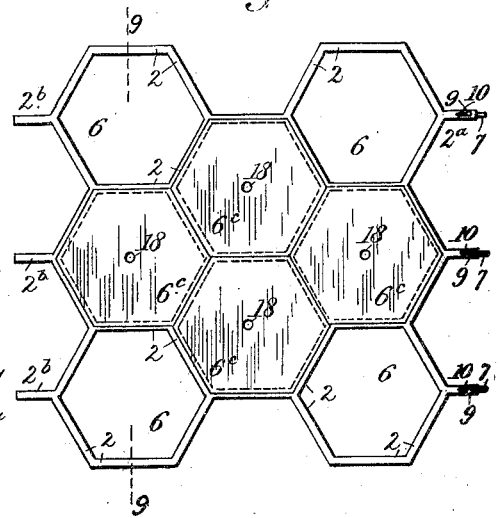
Figure 8:
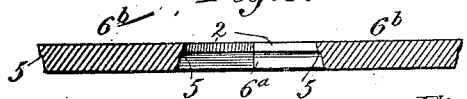
Fig. 8 is a section on the line 8—8 of Fig. 6.
Figure 9:
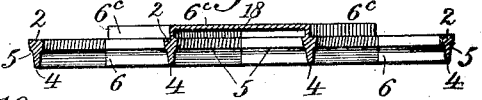
Fig. 9 is a section on the line 9—9 of Fig. 7.

Now, another web of tile molds 6, as shown in Fig. 7, and corresponding in outline to the mold form shown in Fig. 6, but with those parts corresponding to the tile molds 6$^a$ provided with covers 6$^c$ having air holes 18 therein, is placed upon the tile forms already produced with the formed tiles entering the covered tile molds. In this way the already formed tiles are protected and the intervening spaces in which no tiles have been formed may be filled with a suitable cement mixture and finished in the manner already described, after which the mold structure shown in Fig. 7 is removed, thus leaving the floor covering with a web of grooves therein outlining the tiles, and with the latter producing such patterns as may have been determined.

By a suitable supply of tile mold webs a great variety of designs are possible with differently colored cements with all the advantages which are obtained with the simple web-like molds such as shown in Fig. 1.

While the showing of the drawings is far from complete as to the various possibilities of the invention, the showing made is sufficient to indicate the wide range of effects of which the invention is capable.

The showing of Fig. 1 and other like figures is that of structures employed for the ordinary small tile forms.

Figure 13:
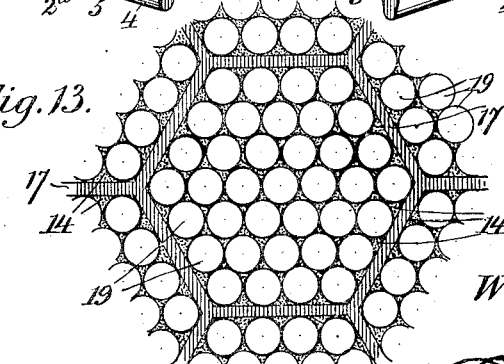
Fig. 13 is a plan view of a small fragment of a pavement or other covering, especially where the tile forms are of relatively large size.

Under some circumstances it is desirable to provide large tile forms, as indicated in Fig. 13, where it may be assumed that the tile is of a size known as a six inch tile, although the showing is not intended to limit the invention to any particular size. In this case the grouting 17 outlines a six inch tile 14 which, however, being of so large a size is susceptible of composite construction. It is assumed in the showing of Fig. 13 that after the preliminary filling of cement in the tile mold, and which filling is not sufficient to reach the top of the mold, a series of disks 19, such as are obtained already glued to a paper carrier, are placed in the located tile mold and are pounded down, with the spaces between them filled up as is customary in laying tile floors of such character. After the composite tiles have been formed in the same manner as described with respect to plain tiles, the grouting 17 is applied as already described and troweled smooth, thus producing an ornamental effect without the necessity of grinding down. It will be understood, of course, that the paper carrier for the disks 19 is removed in the usual manner after the cement holding the disk inserts has set.

In the case of a terrazzo filling for the large tile forms, indicated in Fig. 13, rubbing down may be necessary, but for other effects, rubbing down is avoided.

The invention provides for the production of tiling effects in great variety and some effects which have not heretofore been attempted, such as those possible with the arrangement indicated in Fig. 13.

What is claimed is:—

1. A means for use in the production of homogeneous or monolithic tile surfaces of extended area, corresponding in appearance to surfaces of like extended area formed by many individually laid tiles, comprising a web-like mold having connected walls outlining tile forms, with the walls of generally triangular shape in cross-section and the faces of the walls concaved in the direction of their length.

2. A means for use in the production of homogeneous or monolithic tile surfaces of extended area corresponding in appearance to surfaces of like extended area formed by many individually laid tiles, comprising a web-like mold having connected walls outlining tile forms, with the walls of generally triangular shape in cross-section and the faces of the walls concaved in the direction of their length, each mold including a plurality of tile forms, with the mold provided with terminal bars forming division walls, and the matching bars of groups of molds being provided with means for coupling them, whereby there may be produced an extended area of tile mold forms of groups of joined molds forming smaller units than the extended area.

3. A means for the production of homogeneous or monolithic tile surfaces of extended area corresponding in appearance to surfaces of like extended area formed of many individually laid tiles, which consists in a plurality of web-like mold units each including a plurality of tile outlines, each unit having terminal bars with the corresponding bars of the units provided with means for coupling neighboring units together into an extended series of tile mold forms.

4. A means for the production of homogeneous or monolithic tile surfaces of extended area corresponding in appearance to surfaces of like extended area formed of many individually laid tiles, which consists in a plurality of web-like mold units each including a plurality of tile outlines, each unit having terminal bars with the corresponding bars of the units provided with means for coupling neighboring units together into an extended series of tile mold forms, one of each pair of matching terminal bars of neighboring units being provided with a slidable pin or bolt and the other bar with a socket for receiving the pin or bolt, the pin and socket extending lengthwise of the respective terminal bars.

In testimony that I claim the foregoing as my own I have hereto affixed my signature.

WILLIAM FRED WALLING.